US012589755B2

(12) United States Patent
Morlok et al.

(10) Patent No.: US 12,589,755 B2
(45) Date of Patent: Mar. 31, 2026

(54) SYSTEM FOR PROVIDING AN OUTPUT SIGNAL BASED ON A GENERATED SURROUNDINGS MODEL OF SURROUNDINGS OF A MOBILE PLATFORM

(71) Applicant: Robert Bosch GmbH, Stuttgart (DE)

(72) Inventors: Frederik Morlok, Wildberg Gueltlingen (DE); Boris Kousselson, Plochingen (DE); Julia Heroldt, Stuttgart (DE); Panagiotis Kosioris, Urbach (DE)

(73) Assignee: ROBERT BOSCH GMBH, Stuttgart (DE)

( * ) Notice: Subject to any disclaimer, the term of this patent is extended or adjusted under 35 U.S.C. 154(b) by 239 days.

(21) Appl. No.: 18/578,897

(22) PCT Filed: Aug. 8, 2022

(86) PCT No.: PCT/EP2022/072230
§ 371 (c)(1),
(2) Date: Jan. 12, 2024

(87) PCT Pub. No.: WO2023/046358
PCT Pub. Date: Mar. 30, 2023

(65) Prior Publication Data
US 2024/0317245 A1      Sep. 26, 2024

(30) Foreign Application Priority Data
Sep. 23, 2021    (DE) ..................... 10 2021 210 600.5

(51) Int. Cl.
*B60W 50/02*      (2012.01)
*B60W 50/023*     (2012.01)
(52) U.S. Cl.
CPC ....... *B60W 50/023* (2013.01); *B60W 2556/00* (2020.02)

(58) Field of Classification Search
USPC .................. 701/29.1, 29.7–31.3, 31.9, 32.7, 701/33.6–34.4
See application file for complete search history.

(56) References Cited

U.S. PATENT DOCUMENTS 4,752,869 A * 6/1988 Miller .................... G21C 17/00
976/DIG. 207
6,092,217 A * 7/2000 Kanekawa .......... G06F 11/0763
714/E11.01

(Continued)

FOREIGN PATENT DOCUMENTS

JP      H10340102 A      12/1998
JP      2003115847 A      4/2003

(Continued)

OTHER PUBLICATIONS

International Search Report for PCT/EP2022/072230, Issued Dec. 5, 2022.

*Primary Examiner* — Jonathan L Sample
(74) *Attorney, Agent, or Firm* — NORTON ROSE FULBRIGHT US LLP

(57) ABSTRACT
A system for providing an output signal based on a generated surroundings model of surroundings of a mobile platform is proposed. The system includes: a first subsystem, a second subsystem, wherein the second subsystem is configured to redundantly provide a functionality of the first subsystem, and a third subsystem, wherein the third subsystem is configured to redundantly provide the functionality of the first subsystem and/or of the second subsystem; a first comparison system, a second comparison system, wherein the first comparison system and/or the second comparison system are configured to detect at least one fault in the first subsystem and/or a fault in the second subsystem and/or a fault in the third subsystem and/or to identify the corresponding faulty subsystem.

14 Claims, 3 Drawing Sheets

(56)                  References Cited

U.S. PATENT DOCUMENTS

| | | | | |
|---|---|---|---|---|
| 9,523,984 | B1 * | 12/2016 | Herbach | B60W 10/18 |
| 11,176,007 | B2 * | 11/2021 | Hayes | G06F 13/4022 |
| 11,644,834 | B2 * | 5/2023 | Ditty | G06V 20/58 |
| | | | | 701/23 |
| 11,745,748 | B2 * | 9/2023 | Kain | B60W 50/023 |
| | | | | 701/26 |
| 2009/0259885 | A1 * | 10/2009 | O'Connell | G06F 11/184 |
| | | | | 714/E11.001 |
| 2015/0286544 | A1 * | 10/2015 | Kadri | G06F 11/2033 |
| | | | | 714/13 |
| 2016/0091870 | A1 * | 3/2016 | Jeon | G05B 9/03 |
| | | | | 700/79 |
| 2017/0242745 | A1 * | 8/2017 | Sherlock | G06F 11/2092 |
| 2018/0267549 | A1 * | 9/2018 | Kopetz | G06F 11/184 |
| 2018/0267550 | A1 * | 9/2018 | Kopetz | B60W 60/0011 |
| 2018/0364673 | A1 * | 12/2018 | Van Wensen | G06F 11/1658 |
| 2019/0258251 | A1 * | 8/2019 | Ditty | G06F 15/7807 |
| 2020/0301418 | A1 * | 9/2020 | Dingli | B60W 50/023 |
| 2020/0327023 | A1 * | 10/2020 | Hayes | G06F 13/4022 |
| 2021/0117787 | A1 * | 4/2021 | Stal | G06N 3/04 |

FOREIGN PATENT DOCUMENTS

| | | |
|---|---|---|
| JP | 2004342077 A | 12/2004 |
| JP | 2008503002 A | 1/2008 |
| JP | 2020506472 A | 2/2020 |

* cited by examiner

SYSTEM FOR PROVIDING AN OUTPUT SIGNAL BASED ON A GENERATED SURROUNDINGS MODEL OF SURROUNDINGS OF A MOBILE PLATFORM

BACKGROUND INFORMATION

Modern automotive system architectures are becoming more complex and more powerful from day to day. A very representative example is automated driving systems (ADS) in the context of self-driving vehicles (SDV). Corresponding to the level of driving automation (SAE J3016) for which they are being developed, these systems must also offer a high level of safety and availability.

The focus of current developments by automobile manufacturers lies in the range from Level 2 to Level 4. The most important transition is that between partial automation (Level 2) and conditional automation (Level 3), since in the latter case a driver is not required as a safety-relevant immediate fallback level for driving.

The main difference between Level 4, with high automation, and Level 5, with full automation, is the ability of the system to handle certain restricted driving modes with regard to all driving modes if, in particular, such vehicle types have no steering wheel at all.

SUMMARY

In general, within a target function for automatic driving (AD) data from different sensors are collected, synthesized and merged in order to generate a model of the current driving situation in the environment perception (EP) and vehicle localization (VL) systems. The model is used by the behavioral planning (BP) system in order to create a route or a trajectory with respect to the current driving situation and the planned journey. The actuator management (AM) system handles the control of the different actuators that follow the calculated route.

With respect to the driving automation levels (SAE J3016), from stage 3+ automated driving systems require a fail-operational architecture, i.e., after a failure of a component, the system should continue to operate safely, at least for a certain time.

According to aspects of the present invention, a system for providing an output signal, a control unit, a mobile platform and a use of a system are proposed. Advantageous embodiments of the present invention are disclosed herein.

Throughout this description of the present invention, the sequence of method steps is shown in such a way that the method is easy to understand. However, the person skilled in the art will recognize that many of the method steps can also be run through in a different order and result in the same or a corresponding result. In this sense, the sequence of the method steps can be changed accordingly. Some features are provided with numbers to improve readability or make the assignment clearer, although this does not imply a presence of certain features.

A system with a fault-tolerant design, i.e., a fault-tolerant system, is configured to maintain a defined functionality if parts of the system fail, the system typically having a high degree of redundancy for this purpose.

In particular, high-availability systems can be configured differently with respect to fault tolerance:

In a fail-operational mode, if a part of the system fails an intended operation can be continued, possibly for a limited period of time, instead of failing entirely.

In a fail-degraded mode, if a part of the system fails the system can continue the intended operation at a reduced "level" instead of failing entirely.

In the event of a partial failure within such a system, a transition from the faulty subsystem to a remaining independent, non-faulty subsystem is performed.

In addition, a high-availability system can take into account the entire electrical and/or electronic architecture of the vehicle, i.e. including a power supply (PowerNet), communication buses, cooling systems, and in particular even faults with a common cause, and can be configured to continue operation even in the event of failures, so that even if a fault is present a redundancy in the system with the highest possible availability of respective services is required.

In general, a functionality that corresponds to level L3+ (i.e., L3, L4, L5) requires redundant structures in order to enable fault limitation and/or degradation and/or full operability following the occurrence of a first fault, e.g., an electrical and/or electronic fault (E/E fault) within an AD system (automated driving system: ADS).

According to an example embodiment of the present invention, in order to achieve this, a system can be designed such that:

In each fault scenario, a necessary system functionality is still available within the main ECU (electronic control unit), as a primary system, or within a back-up ECU, as a secondary system. In this case, the system functionality can be complete or reduced according to the scenario.

A corresponding control unit (main control unit), as a primary system, or a back-up control unit, as a secondary system, is configured to recognize its own failure and to prevent invalid data from being communicated to further processing stages, such as actuators, for example. Preventing invalid data from being communicated to further processing stages can be defined as a passivation or "fail-silent" configuration.

Processing stages of the system, such as actuators, can be configured, for example, to recognize an interruption in communication with a preceding stage and only to accept communication from remaining valid control units.

According to ISO 26262:2018, electronic and/or electrical failures (E/E failures), with respect to random transient/permanent hardware (HW) failures, must be recognized within the system with an SPFM (single-point fault metric) of ≥99%, wherein the ASIL D availability safety target is assumed. This requirement can be assigned to a single control unit (ECU) with respect to the first fault recognition. Each control unit must be able to recognize its own E/E failures with an SPFM ≥99%.

If a first failure within the main control unit (primary system) is recognized, the system can react with its redundant back-up control unit (secondary system) in order to control the vehicle and with minimum risk to bring the vehicle into a safe state within an EOTTI (emergency operation tolerance time interval).

According to one aspect of the present invention, a system for providing an output signal based on a generated surroundings model of surroundings of a mobile platform is provide.

According to an example embodiment of the present invention, the system includes:

a first subsystem for generating the output signal, which is configured to be coupled for signaling to a first sensor system;

a second subsystem for generating the output signal, which is configured to be coupled for signaling to the first sensor system; wherein the second subsystem is configured to redundantly provide a functionality of the first subsystem;

a third subsystem for generating the output signal; wherein the third subsystem is configured to be coupled for signaling to a second sensor system;

wherein the third subsystem is configured to redundantly provide the functionality of the first subsystem and/or of the second subsystem;

a first comparison system coupled for signaling to an output of the first subsystem and to an output of the second subsystem and to an output of the third subsystem;

a second comparison system coupled for signaling to the output of the first subsystem and to the output of the second subsystem and to the output of the third subsystem;

wherein the first comparison system and the second comparison system are coupled for signaling; and the first comparison system and/or the second comparison system are configured to recognize at least one fault with the first subsystem and/or a fault with the second subsystem and/or a fault with the third subsystem and/or to identify the corresponding faulty subsystem.

According to one aspect of the present invention, the output signal can be any signal for a control of a downstream system and/or can be a surroundings model of surroundings of the mobile platform and/or can be a trajectory which results in particular from a planning of a route for the mobile platform, and/or control signals for the mobile platform, in order to drive a trajectory by means of the actuator system or individual actuators of the actuator system.

In other words, the output signal of the relevant subsystem can be a generic signal which is provided to a downstream further processing system.

According to one aspect of the present invention, it is provided that the first comparison system and/or the second comparison system are configured to recognize a fault with the first subsystem or a fault with the second subsystem or a fault with the third subsystem and to identify the respective faulty subsystem.

According to one aspect of the present invention, it is provided that the first comparison system and/or the second comparison system are configured to recognize at least one fault with the first subsystem and/or at least one fault with the second subsystem independent of and different from the first subsystem and/or at least one fault with the third subsystem independent of and different from the first and second subsystems.

According to one aspect present invention, it is provided that the first comparison system and/or the second comparison system are configured to recognize an unavailability of the first subsystem and/or an unavailability of the second subsystem and/or an unavailability of the third subsystem and to identify the respective unavailable subsystem In particular, the described system according to the present invention can be configured with redundant sensor systems and/or with redundant control units, i.e., main and back-up control units, as primary system and secondary system, such as the first electronic control unit and the second electronic control unit and/or with redundant actuators and/or with redundant communication between actuators and/or with redundant control units, in order to be as fault-tolerant as possible with regard to failures of subsystems.

Advantageously, this system is fault-tolerant with regard to a failure of one of the three subsystems, in particular for random hardware failures, which can be required in particular in use in an at least partially automated driving system (ADS).

This is because the system is configured to recognize a first fault, and additionally to recognize a second fault, depending on the respective fault scenario.

According to an example embodiment of the present invention, the system for providing an output signal optimizes a diagnostic coverage of a first fault in comparison with an availability of a functionality. This is because fault recognition always requires recognition mechanisms. These recognition mechanisms are becoming more and more complex with increasing requirements for a required diagnostic coverage for a specific fault mode. However, such diagnostic mechanisms themselves are subject to random hardware faults, which in turn can lead to false-positive detections of faults. For this reason, a probability of a random hardware fault generally increases if a diagnostic coverage is increased.

The probability of loss of availability (=non-availability) of a system with one functionality can be determined according to the following formula for the probability P(FV) of the availability of the functionality:

$$P(FV) = P(FA) + P(Efp)$$

where P(FA) is a probability of a functionality failure and P(Efp) is a probability of the recognition mechanism giving a false positive. As the complexity of the elements within the system increases, this relationship is becoming more and more important.

For example, a failure probability of a CPU lockstep—in which a correct functionality of the main function block is determined by means of a comparison system, which is redundant to a main function block, can be determined by means of a comparison function block, which checks a match of the functionality of the main function block with the comparison system—can increase a failure probability of this CPU lockstep overall system by more than a factor of two, since, in addition to the fault rates of the main function block and of the comparison system, even the comparison function block has a false-positive fault rate.

In addition, a second occurring fault should also be taken into consideration for a fault-tolerant system. If, in such a system with one redundant subsystem, a second fault occurs within an emergency operation tolerance time interval (EOTTI), the system will no longer be able to control the vehicle safely, since no further safety elements are present.

This fact is independent of whether or not a second fault can be recognized.

In other words, a high diagnostic coverage level can lead to a lower availability of a control unit with a redundant subsystem, in particular if a second fault is also to be covered.

With respect to an availability target, a solution other than a high recognition coverage is therefore required. This is because an increase in the recognition rate of a second fault means an additional complexity, which in turn increases the probability of a second fault. This leads to an increased risk of a system failure during the emergency operation tolerance time interval (EOTTI). A higher coverage for the recognition of a second fault therefore reduces safety and a system availability.

For this reason, according to an example embodiment of the present invention, the system described herein for providing an output signal, in particular with respect to the recognition of a second fault, has advantages compared to a system with a dual-duplex redundancy architecture.

With a dual-duplex redundancy architecture, a system is configured which has two independent system branches, or two independent ECUs (electronic control units), which are each provided with two redundant function blocks. In this architecture, in each system branch the output signals of the redundant function blocks are compared in order to switch off the relevant system branch in the event of a fault, i.e., if the output signals do not match. If the other system branch is working correctly, with the dual-duplex redundancy architecture the first electrical and/or electronic failure (E/E) fault can be recognized by the result comparison and compensated for by the second system branch. For this purpose, the two system branches can be operated in each case independent CPUs.

In the event of a fault being detected, a control unit with such a dual-duplex redundancy architecture reacts with the fail-silent mechanism and stops the communication to actuators which are being provided with the output signal of the system, while the remaining system branch of the control unit still has a high recognition rate for a further fault, but, in contrast to the system described here for providing an output signal, can no longer compensate for a second fault and has an undiminished probability of a second failure.

In particular, with the system according to an example embodiment of the present invention described here for providing an output signal, a probability of a first electrical fault and/or electronic fault (E/E failure: electrical and/or electronic failure) within the system, which can lead to a degradation of the system, can be significantly reduced.

Such a first electrical fault and/or electronic fault could, for example, cause triggering of an execution of a vehicle maneuver with minimal risk, such as stopping in an emergency lane.

In other words, the described system makes possible a high recognition coverage (SPFM) for each first electrical fault and/or electronic fault (E/E fault) within the system. For most fault scenarios such a remaining recognition coverage for a second fault during the EOTTI can still be high in the system described here for providing an output signal.

In this case, a capability of the system for recognizing a second fault is dependent on the part in which the described system a first fault occurred. In particular, a high recognition coverage persists for the second fault if the first fault occurs, for example, in the third subsystem and/or in the second comparison system or in the first subsystem or in the second subsystem, which are in each case part of the first electronic control unit.

If the first fault occurs, for example, in the power supply or in the first comparison system of the first electronic control unit, a reduced fault recognition for the second fault can still be achieved via additional hardware fault-recognition mechanisms.

Due to the persisting recognition coverage for a second fault during an EOTTI (emergency operation tolerance time interval), a probability of non-availability of the system during the EOTTI, which could lead to the safety target being compromised, is significantly reduced.

Since the system has fewer hardware components than, for example, a dual-duplex redundant autonomous driving system (ADS) computer-set architecture, costs for hardware components can be significantly reduced.

Since fewer hardware components need to be operated, an energy consumption of the system can be significantly reduced, whereby a $CO_2$ emission is reduced, an increase in range for electric vehicles results, and a reduced effort for a cooling system is necessary. In addition, a weight of the system configured in this way can advantageously be reduced due to the lower number of hardware components.

According to one aspect of the present invention, it is provided that the first subsystem and the second subsystem and the first comparison system are part of a first electronic control unit; and the third subsystem and the second comparison system are part of a second electronic control unit.

Advantageously, the two comparison systems for the described system according to the present invention can be divided into the first electronic control unit and the second electronic control unit, i.e. the respective "compare, select, disable" mechanisms, in order to avoid a single point of failure (SPOF) with respect to availability.

According to one aspect of the present invention, it is provided that electrical energy is provided for the first electronic control unit by a first power supply, and electrical energy for the second electronic control unit is provided by a second power supply, and the first power supply and the second power supply are set up to provide the electrical energy of the first power supply independently of the electrical energy of the second power supply. It can thereby be achieved that the system is more fault-tolerant and has higher availability.

According to one aspect of the present invention, it is provided that the first sensor system is identical to the second sensor system. The first sensor system and/or the second sensor system can comprise a plurality of sensors.

According to one aspect of the present invention, it is provided that the second sensor system is a redundant sensor system in relation to the first sensor system. If the first sensor system is redundant in relation to the second sensor system, the system for providing the output signal can thus be more available and more fault-tolerant.

According to one aspect of the present invention, it is provided that the first electronic control unit with the first power supply is set up and configured to interact with the correspondingly set up and configured second electronic control unit with the second power supply such that the system for providing the output signal is fault-tolerant and highly available.

According to one aspect of the present invention, it is provided that the first comparison system and the second comparison system are set up to recognize a fault in the first subsystem and/or a fault in the second subsystem and/or a fault in the third subsystem when the surroundings model is determined by the respective subsystem.

This can advantageously be achieved by comparing the corresponding output signals of the subsystems with one another.

According to one aspect of the present invention, it is provided that the first comparison system is set up to selectively provide an actuator system with an output signal of the first subsystem or an output signal of the second subsystem, depending on a recognized fault in the respectively identified first subsystem and/or in the second subsystem and/or in the third subsystem.

In this way, a valid output signal can be provided to the actuator system, which itself can be designed to be redundant, even if one of the subsystems has faults.

According to one aspect of the present invention, it is provided that the first comparison system is set up to provide an actuator system with the output signal of the first subsystem and the output signal of the second subsystem, depending on a recognized fault in the respectively identified first subsystem and/or in the second subsystem and/or in the third subsystem.

In this way, a valid output signal can be provided to the actuator system, which itself can be designed to be redundant, even if one of the subsystems has faults.

According to an example embodiment of the present invention, for providing the output signal of the first or the second subsystem to the actuator system, the first comparison system can be coupled for signaling to the actuator system with a switch and/or a changeover switch, for switching or switching over, in order to provide the actuator system with the output signal of the second subsystem, depending on a recognized fault in the output signal of the first subsystem. For this purpose, the output signal of the first subsystem and of the second subsystem can be provided to the changeover switch as an input signal, wherein the changeover switch can be switched by the first comparison system, and the output signal of the changeover switch can be provided as an input signal to the switch which with its output is coupled for signaling to the actuator system.

According to one aspect of the present invention, it is provided that the second comparison system is set up to provide the actuator system with an output signal of the third subsystem, depending on a recognized fault in the respectively identified first subsystem and/or in the second subsystem and/or in the third subsystem.

A valid output signal can thus be provided to an output of the system or, for example, to the actuator system, even if the first comparison system no longer provides the output signal of the first subsystem and of the second subsystem to the output of the system, in particular to the actuator system.

According to an example embodiment of the present invention, to provide the output signal of the third subsystem, the second comparison system can be coupled for signaling to the actuator system with a further switch for switching, in order to provide the output signal of the third subsystem to the actuator system depending on a recognized fault. For this purpose, the output signal of the third subsystem can be provided to the further switch as an input signal, wherein the further switch can be switched by the second comparison system, and the output signal of the further switch can be coupled for signaling as an input signal with its output to the actuator system.

According to one aspect of the present invention, it is provided that the system for providing the output signal
  comprises a first input for providing a signal of the first sensor system; and
  comprises a second input for providing a signal of the second sensor system and comprises a first computing unit, wherein the first computing unit is set up to generate the output signal and/or a surroundings model of surroundings of the mobile platform by means of the first subsystem and/or the second subsystem.

In addition, according to an example embodiment of the present invention, the system for providing the output signal comprises a second computing unit, wherein the second computing unit is set up to generate the output signal and/or the surroundings model of surroundings of the mobile platform by means of the third subsystem.

Furthermore, according to an example embodiment of the present invention, the system for providing the output signal has a first output for providing control signals of the first computing unit to the actuator system and/or to a subsequent system; and a second output for providing control signals of the second computing unit to the actuator system and/or to a subsequent system, wherein the first computing unit comprises the first comparison system in order to selectively provide at the first output an output signal of the first subsystem or of the second subsystem. The second computing unit of the system for providing the output signal comprises the second comparison system in order to selectively provide an output signal of the third subsystem at the second output of the system for providing the output signal.

According to one aspect of the present invention, the first computing unit and/or the second computing unit can have one or more systems-on-chip.

In particular, the first computing unit for providing the functionality of the first subsystem and of the second subsystem can in each case have a system-on-chip; the second computing unit can have a further system-on-chip to provide the functionality of the third subsystem.

According to one aspect of the present invention, the output signal can be any signal for controlling a downstream system and/or can be a surroundings model of surroundings of the mobile platform and/or can be a trajectory which results in particular from a planning of a route for the mobile platform and/or can be control signals for the mobile platform, in order to drive a trajectory by means of the actuator system or of individual actuators of the actuator system.

According to an example embodiment of the present invention, a control unit for use in a vehicle is provided, said control unit comprising one of the systems described above for providing an output signal.

Such a control unit can also have further functions.

Advantageously, with such a control unit, the system can easily be integrated into different mobile platforms, such as in particular automated driving systems for driving automation levels 3+, 4 and 5 (SAE J3016).

According to an example embodiment of the present invention, a mobile platform, and in particular an at least partially automated vehicle, is provided, which has a control unit as described above.

Advantageously, a mobile platform equipped in this way can realize all the above-described advantages of the system for providing the output signal.

According to an example embodiment of the present invention, a use of one of the systems described above for generating a surroundings model of surroundings of a mobile platform is provided.

A mobile platform can be understood to be an at least partially automated system which is mobile, and/or a driver assistance system of a vehicle. An example can be an at least partially automated vehicle or a vehicle with a driver assistance system. That is to say, in this context, an at least partially automated system includes a mobile platform with respect to at least partially automated functionality, but a mobile platform also includes vehicles and other mobile machines including driver assistance systems. Other examples of mobile platforms may include multi-sensor driver assistance systems, multi-sensor mobile robots such as robotic vacuum cleaners or lawn mowers, a multi-sensor monitoring system, a manufacturing machine, a personal assistant or an access control system. Each of such systems can be a fully or partially automated system.

BRIEF DESCRIPTION OF THE DRAWINGS

An exemplary embodiment of the present invention is illustrated with reference to FIG. 1 and explained in more detail below.

FIG. 1 shows a system for providing an output signal, according to an example embodiment of the present invention.

FIG. 2 shows an example of a partial failure in the system for providing an output signal, according to an example embodiment of the present invention.

FIG. 3 shows further examples of partial failures in the system for providing an output signal, according to an example embodiment of the present invention.

DETAILED DESCRIPTION OF EXAMPLE EMBODIMENTS

Figure 1:
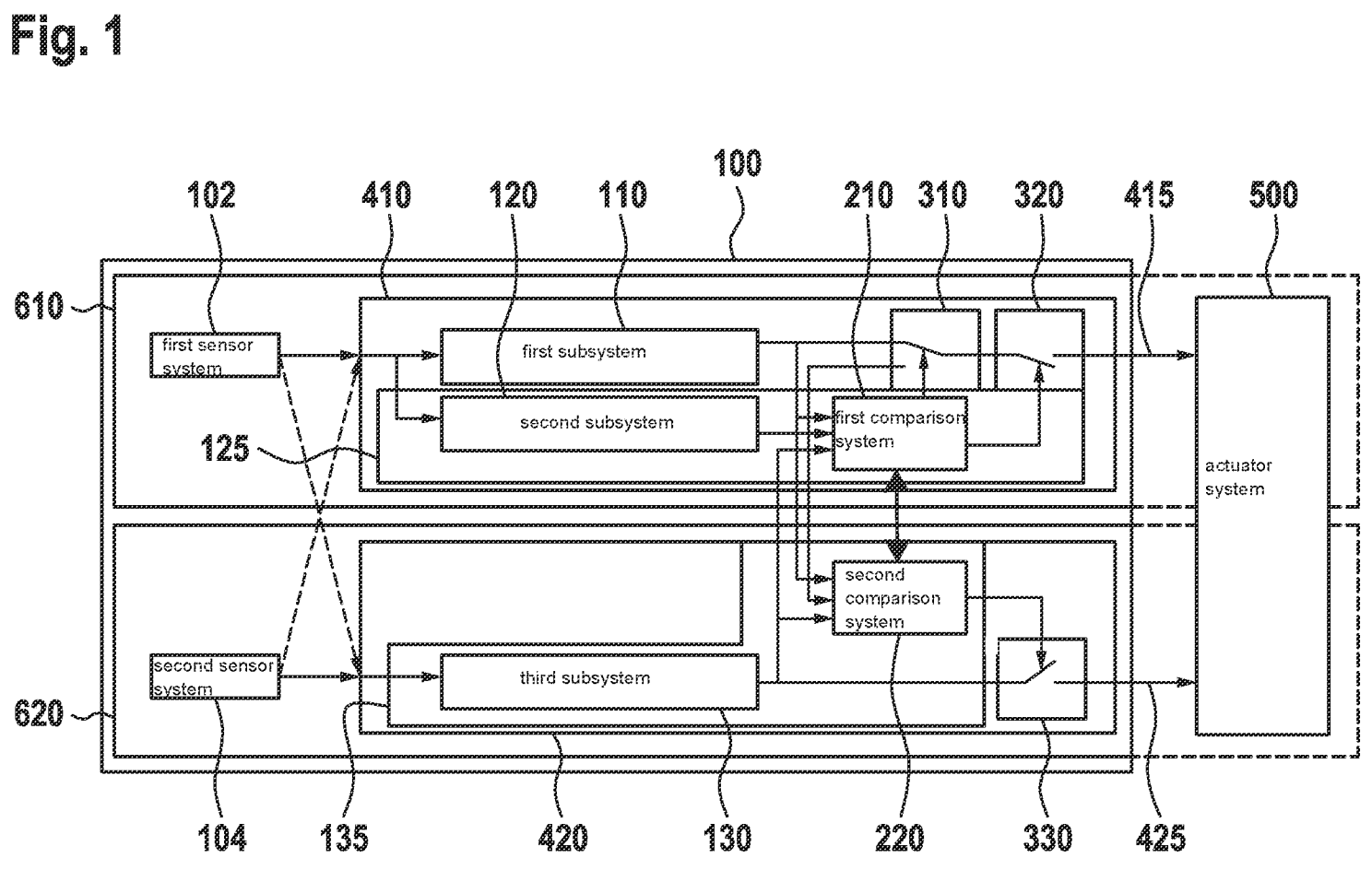

FIG. 1 schematically shows a control unit, in particular for use in a mobile platform, such as in a vehicle, which comprises a system for providing an output signal based on a generated surroundings model of surroundings of a mobile platform. The control unit can be used to generate a surroundings model of surroundings of the mobile platform. The output signal can be any signal for controlling a downstream system and/or can be a surroundings model of surroundings of the mobile platform and/or can be a trajectory which results in particular from a planning of a route for the mobile platform and/or can be a control signal for the mobile platform in order to drive a trajectory by means of the actuator system or individual actuators of the actuator system.

The system 100 contains a first subsystem 110, which is suitable for generating the output signal, and which is configured to be coupled for signaling to a first sensor system 102.

In addition, the system 100 contains a second subsystem 120 for generating the output signal, which is configured to be coupled for signaling to the first sensor system 102. The second subsystem 120 is configured to redundantly provide a functionality of the first subsystem 110.

In addition, the system 100 contains a third subsystem 130, for generating the output signal, wherein the third subsystem is configured to be coupled for signaling to a second sensor system 104.

The third subsystem 130 is configured to redundantly provide the functionality of the first subsystem 110 and/or of the second subsystem 120.

Alternatively or additionally, the first and the second subsystem 110, 120 can be coupled for signaling to the second sensor system 104 and/or the third subsystem 130 can be coupled for signaling to the first sensor system 102, in particular the first sensor system 102 can be redundant with respect to the second sensor system 104. The first sensor system 102 and the second sensor system 104 can each contain a plurality of sensor systems. Alternatively or additionally, the first sensor system 102 can be identical to the second sensor system 104.

In addition, the system 100 contains a first comparison system 210, which is coupled for signaling to an output of the first subsystem 110 and to an output of the second subsystem 120 and to an output of the third subsystem 130.

A second comparison system 220 of the system 100 is coupled for signaling to the output of the first subsystem 110 and to the output of the second subsystem 120 and to the output of the third subsystem 130.

Figure 2:
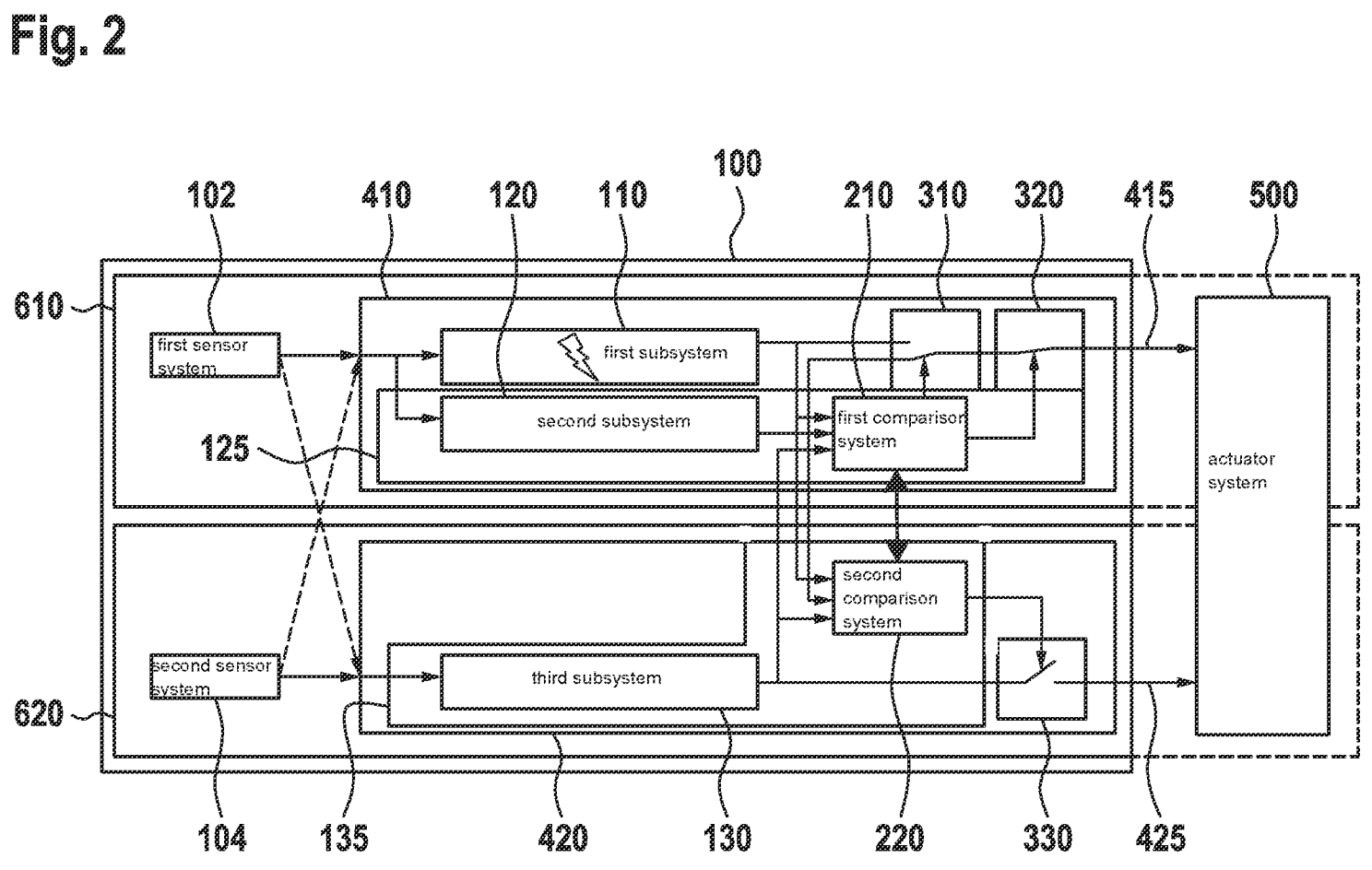
Figure 3:
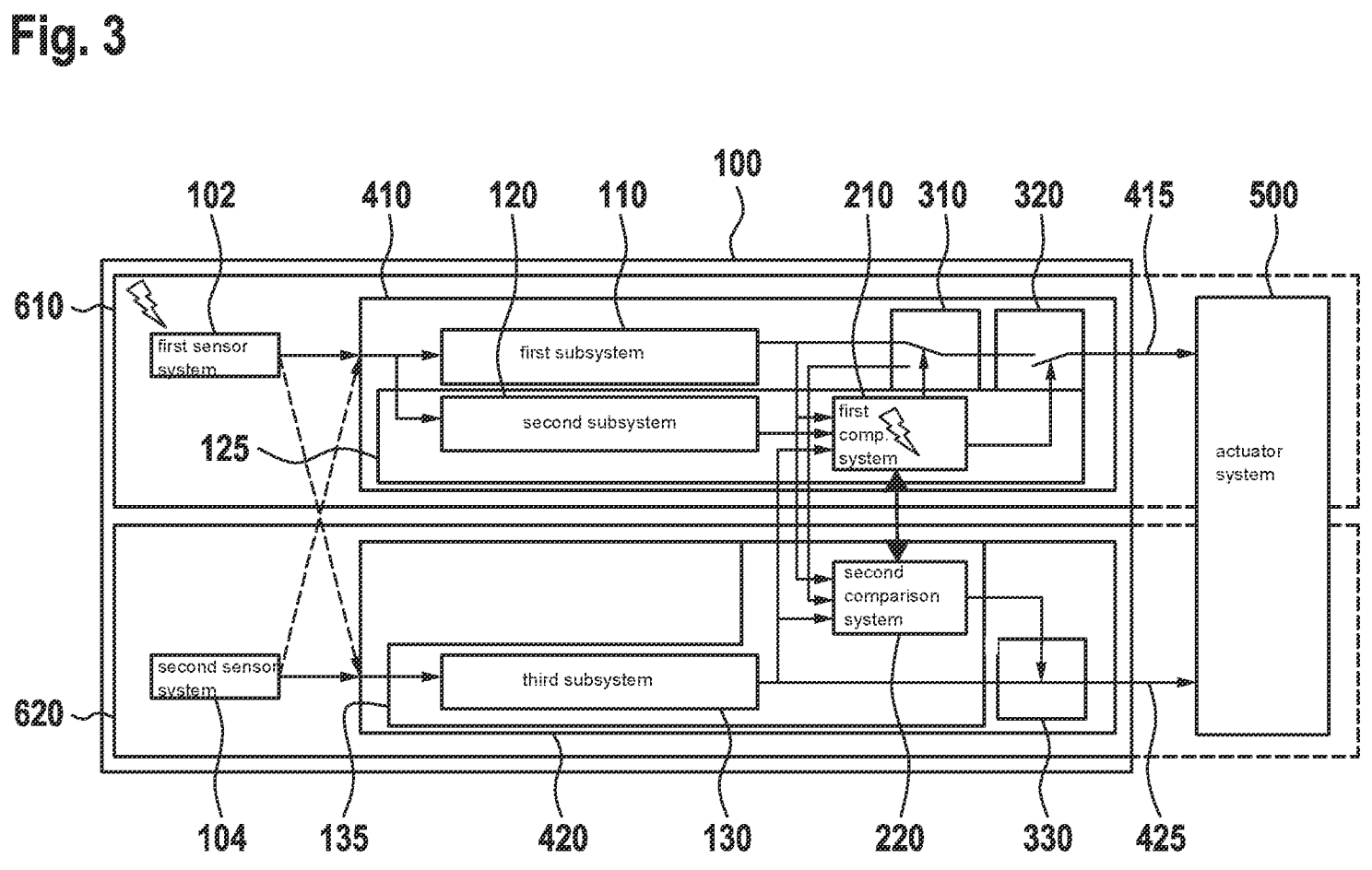

The first comparison system 210 and the second comparison system 220 are coupled for signaling, as indicated by a double-headed arrow between the comparison systems in FIGS. 1 to 3, in order in particular to provide corresponding comparison results of the respective comparison system with 210, 220, and the first comparison system 210 the second comparison system 220 are configured to recognize at least one fault in the first subsystem 110 and/or a fault in the second subsystem 120 and/or a fault in the third subsystem 130, and in particular to identify the corresponding faulty subsystem 110, 120, 130.

For recognizing a fault, in particular random hardware failure faults, the redundantly calculated output signals of the first subsystem 110 and of the second subsystem 120 and of the third subsystem 130 can be compared. By such a comparison with the described first comparison system 210 and the described second comparison system 220, the corresponding subsystem in which a fault has occurred can additionally be unambiguously identified.

With this fault recognition and fault localization, the subsystem with the failure can be deactivated separately, wherein two redundant subsystems are nevertheless retained for a redundant provision of the output signals, so that a further fault can be detected.

The comparison of the output signals themselves can be a simple "bit-equal" comparison, e. g., by computational checksum testing; alternatively or additionally, the comparison of the output signals can also be more complex.

Intermediate comparison steps during the calculation of the output signals with the respective subsystems can even reduce a latency time for the recognition of a fault. Intermediate comparisons can reduce the effort for demonstrating the effectiveness of the recognition mechanism and increase the diagnostic coverage.

In other words, the second subsystem 120 together with the first comparison system 210 can be regarded as a first detection and back-up system 125 for the first subsystem 110 and/or the third subsystem 130. Accordingly, the third subsystem 130 together with the second comparison system 220 can be regarded as a second detection and back-up system 135 for the first subsystem 110 and/or the second subsystem 120.

The first subsystem 110 and the second subsystem 120 and the first comparison system 210 are part of a first electronic control unit 410.

The third subsystem 130 and the second comparison system 220 are part of a second electronic control unit 420. This division, in particular of the two comparison systems 210, 220, into the first electronic control unit and the second electronic control unit, i.e. the respective "compact, select, disable" mechanisms, can be made in such a way that the single point of failure, with respect to availability, is avoided.

To increase the failure tolerance of the system 100, electrical energy for the first electronic control unit 410 is provided by a first power supply 610 and electrical energy for the second electronic control unit 420 is provided by a second power supply 620. The first power supply 610 and the second power supply 620 are set up to provide the electrical energies independently of one another. In particular, the first power supply 610 and the second power supply 620 can correspondingly redundantly supply electrical energy to an actuator system 500 which can contain redundant actuators, in each case redundant actuators to increase failure tolerance.

With these two power supplies 610, 620, the system for providing the output signal can be designed to be fault-tolerant and highly available by the first electronic control unit 410 with the first power supply 610 being set up and configured to interact with the correspondingly set up and configured second electronic control unit 420 with the second power supply 620.

The first comparison system 210 is set up with a changeover switch 310, with which the first comparison system 210 is coupled for signaling, to selectively provide an output signal of the first subsystem 110 or an output signal of the second subsystem 120, depending on a recognized fault in the respectively identified first subsystem 110 and/or in the second subsystem 120 and/or in the third subsystem 130, in an actuator system 500 at an output 415 of the system 100.

In addition, the first comparison system 210 is set up with a switch 320, with which the first comparison system 210 is coupled for signaling, to provide the output signal of the first subsystem 110 and the output signal of the second subsystem 120, depending on a recognized fault in the respectively identified first subsystem 110 and/or in the second subsystem 120 and/or in the third subsystem 130, in the actuator system 500 at the output 415 of the system 100, corresponding to a "fail-silent mechanism."

In addition, the second comparison system 220 is set up with a switch 330, with which the second comparison system 220 is coupled for signaling, to provide an output signal of the third subsystem 130, depending on a recognized fault in the respectively identified first subsystem 110 and/or in the second subsystem 120 and/or in the third subsystem 130, in the actuator system 500 at an output 425 of the system 100, corresponding to a "fail-silent mechanism."

FIG. 2 schematically shows how the system 100, in the event of a fault in the first subsystem 110, connects the redundantly determined output signal of the second subsystem 120 to the output 415 of the system 100 by means of the first comparison system 210, which acts on the changeover switch 310, in order to provide said signal to the actuator system 500 instead of the output signal of the first subsystem 110.

For this purpose, the first comparison system 210 compares the output signals of the first subsystem 110 and of the second subsystem 120 and of the third subsystem 130 and when a fault, in particular a random hardware failure fault, is recognizes, switches the changeover switch 310, such that the output signal of the second subsystem 120 is provided at the output 415 of the system 100.

By the first comparison system 210 comparing the three subsystems 110, 120, 130, not only can a fault be recognized, but also identified in the corresponding subsystem of the three subsystems 110, 120, 130.

With this fault recognition and fault localization, the subsystem with the relevant fault or failure can be deactivated separately, wherein two redundant subsystems, namely the second subsystem 120 and the third subsystem 130, are nevertheless retained for providing the output signals and for recognizing a second fault.

In other words, on the basis of a comparison of 3 independent calculation tracks, with regard to a random hardware failure in the three subsystems 110, 120, 130, the calculation track which has the first failure can be unambiguously identified.

Due to the fault recognition and localization, the failed lane (calculation track) or the relevant subsystem 110, 120, 130 can be disconnected separately without both redundant communication channels being lost to the actuators at the same time.

In other words, with the system 100 a high detection range remains for a second failure within an EOTTI after the occurrence of a first fault.

FIG. 3 schematically shows a reduced detection range for a second failure within an EOTTI of the system 100 in the event of a fault or failure in the first power supply 610 and/or in the event of a fault in the first comparison system 210.

In these cases, the first comparison system 210 deactivates the switch 320, so that an output signal is provided for an actuator system 500 neither by the first subsystem 110 nor by the second subsystem 120 at the output 415 of the system 100.

The second comparison system 220 is configured and set up to recognize and identify not only the fault within the power supply 610 but also the fault with the first comparison system 210 and switches the output signal of the third subsystem 130, by means of the switch 330, with which the second comparison system 220 is coupled for signaling, to an output 425 of the system 100, for providing to the actuator system 500.

The invention claimed is:

1. A system for providing an output signal based on a generated surroundings model of surroundings of a mobile platform, comprising:
   a first subsystem configured to generate the output signal, the first subsystem being configured to be coupled for signaling to a first sensor system;
   a second subsystem configured to generate the output signal, the second subsystem configured to be coupled for signaling to the first sensor system, wherein the second subsystem is configured to redundantly provide a functionality of the first subsystem;
   a third subsystem configured to generate the output signal, wherein the third subsystem is configured to be coupled for signaling to a second sensor system, and wherein the third subsystem is configured to redundantly provide a functionality of the first subsystem and/or of the second subsystem;
   a first comparison system coupled for signaling to an output of the first subsystem and to an output of the second subsystem and to an output of the third subsystem;
   a second comparison system coupled for signaling to the output of the first subsystem and to the output of the second subsystem and to the output of the third subsystem;
   wherein the first comparison system and the second comparison system are coupled for signaling; and
   where the first comparison system and/or the second comparison system are configured to: (i) recognize at least one fault in the first subsystem and/or a fault in the second subsystem and/or a fault in the third subsystem, and/or (ii) identify a faulty subsystem.

2. The system according to claim 1, wherein the first subsystem and the second subsystem and the first comparison system are part of a first electronic control unit; and the third subsystem and the second comparison system are part of a second electronic control unit.

3. The system according to claim 2, wherein electrical energy for the first electronic control unit is provided by a first power supply, and electrical energy for the second electronic control unit is provided by a second power supply, the first power supply and the second power supply being set up to provide the electrical energy of the first power supply independently of the electrical energy of the second power supply.

4. The system according to claim 1, wherein the first sensor system is identical to the second sensor system.

5. The system according to claim 1, wherein the second sensor system is a redundant sensor system in relation to the first sensor system.

6. The system according to claim 1, wherein the first electronic control unit with the first power supply is set up and configured to interact with the second electronic control unit correspondingly set up with the second power supply such that the system for providing the output signal is fault-tolerant and highly available.

7. The system according to claim 1, wherein the first comparison system and the second comparison system are set up to recognize a fault in the first subsystem and/or a fault in the second subsystem and/or a fault in the third subsystem when the surroundings model is determined by the first subsystem and/or the second subsystem, and/or the third subsystem.

8. The system according to claim 1, wherein the first comparison system is set up to selectively provide an actuator system with the output signal of the first subsystem or the output signal of the second subsystem, depending on a recognized fault in the first subsystem and/or in the second subsystem and/or in the third subsystem.

9. The system according to claim 1, wherein the first comparison system is set up to provide the actuator system with the output signal of the first subsystem and the output signal of the second subsystem, depending on a recognized fault in the first subsystem and/or in the second subsystem and/or in the third subsystem.

10. The system according to claim 1, wherein the second comparison system is set up to provide the actuator system with the output signal of the third subsystem, depending on a recognized fault in the first subsystem and/or in the second subsystem and/or in the third subsystem.

11. The system according to claim 1, further comprising:
a first input for providing a signal of the first sensor system;
a second input for providing a signal of the second sensor system;
a first computing unit, wherein the first computing unit is set up to generate the surroundings model of the surroundings of the mobile platform using the first subsystem and/or the second subsystem;
a second computing unit, wherein the second computing unit is set up to generate the surroundings model of the surroundings of the mobile platform using the third subsystem;
a first output configured to provide control signals of the first computing unit to the actuator system;
a second output configured to provide control signals of the second computing unit to the actuator system;
wherein the first computing unit includes the first comparison system in order to selectively provide the output signal of the first subsystem or of the second subsystem at the first output; and
wherein the second computing unit includes the second comparison system in order to selectively provide an output signal of the third subsystem at the second output.

12. A control unit for use in a vehicle, comprising:
a system for providing an output signal based on a generated surroundings model of surroundings of the vehicle, including:
a first subsystem configured to generate the output signal, the first subsystem being configured to be coupled for signaling to a first sensor system;
a second subsystem configured to generate the output signal, the second subsystem configured to be coupled for signaling to the first sensor system, wherein the second subsystem is configured to redundantly provide a functionality of the first subsystem;
a third subsystem configured to generate the output signal, wherein the third subsystem is configured to be coupled for signaling to a second sensor system, and wherein the third subsystem is configured to redundantly provide a functionality of the first subsystem and/or of the second subsystem;
a first comparison system coupled for signaling to an output of the first subsystem and to an output of the second subsystem and to an output of the third subsystem;
a second comparison system coupled for signaling to the output of the first subsystem and to the output of the second subsystem and to the output of the third subsystem;
wherein the first comparison system and the second comparison system are coupled for signaling; and
where the first comparison system and/or the second comparison system are configured to: (i) recognize at least one fault in the first subsystem and/or a fault in the second subsystem and/or a fault in the third subsystem, and/or (ii) identify a faulty subsystem;
a first input for providing a signal of the first sensor system;
a second input for providing a signal of the second sensor system;
a first computing unit, wherein the first computing unit is set up to generate the surroundings model of the surroundings of the vehicle using the first subsystem and/or the second subsystem;
a second computing unit, wherein the second computing unit is set up to generate the surroundings model of the surroundings of the vehicle using the third subsystem;
a first output configured to provide control signals of the first computing unit to the actuator system;
a second output configured to provide control signals of the second computing unit to the actuator system;
wherein the first computing unit includes the first comparison system in order to selectively provide the output signal of the first subsystem or of the second subsystem at the first output; and
wherein the second computing unit includes the second comparison system in order to selectively provide an output signal of the third subsystem at the second output.

13. An at least partially automated vehicle, comprising:
a control unit including:
a system for providing an output signal based on a generated surroundings model of surroundings of the vehicle, including:
a first subsystem configured to generate the output signal, the first subsystem being configured to be coupled for signaling to a first sensor system;
a second subsystem configured to generate the output signal, the second subsystem configured to be coupled for signaling to the first sensor system, wherein the second subsystem is configured to redundantly provide a functionality of the first subsystem;
a third subsystem configured to generate the output signal, wherein the third subsystem is configured to be coupled for signaling to a second sensor system, and wherein the third subsystem is configured to redundantly provide a functionality of the first subsystem and/or of the second subsystem;

a first comparison system coupled for signaling to an output of the first subsystem and to an output of the second subsystem and to an output of the third subsystem;

a second comparison system coupled for signaling to the output of the first subsystem and to the output of the second subsystem and to the output of the third subsystem;

wherein the first comparison system and the second comparison system are coupled for signaling; and where the first comparison system and/or the second comparison system are configured to: (i) recognize at least one fault in the first subsystem and/or a fault in the second subsystem and/or a fault in the third subsystem, and/or (ii) identify a faulty subsystem;

a first input for providing a signal of the first sensor system;

a second input for providing a signal of the second sensor system;

a first computing unit, wherein the first computing unit is set up to generate the surroundings model of the surroundings of the vehicle using the first subsystem and/or the second subsystem;

a second computing unit, wherein the second computing unit is set up to generate the surroundings model of the surroundings of the vehicle using the third subsystem;

a first output configured to provide control signals of the first computing unit to the actuator system;

a second output configured to provide control signals of the second computing unit to the actuator system;

wherein the first computing unit includes the first comparison system in order to selectively provide the output signal of the first subsystem or of the second subsystem at the first output; and wherein the second computing unit includes the second comparison system in order to selectively provide an output signal of the third subsystem at the second output.

14. A method, comprising:

providing a system for providing an output signal based on a generated surroundings model of surroundings of a mobile platform, the system including:

a first subsystem configured to generate the output signal, the first subsystem being configured to be coupled for signaling to a first sensor system;

a second subsystem configured to generate the output signal, the second subsystem configured to be coupled for signaling to the first sensor system, wherein the second subsystem is configured to redundantly provide a functionality of the first subsystem;

a third subsystem configured to generate the output signal, wherein the third subsystem is configured to be coupled for signaling to a second sensor system, and wherein the third subsystem is configured to redundantly provide a functionality of the first subsystem and/or of the second subsystem;

a first comparison system coupled for signaling to an output of the first subsystem and to an output of the second subsystem and to an output of the third subsystem;

a second comparison system coupled for signaling to the output of the first subsystem and to the output of the second subsystem and to the output of the third subsystem;

wherein the first comparison system and the second comparison system are coupled for signaling; and where the first comparison system and/or the second comparison system are configured to: (i) recognize at least one fault in the first subsystem and/or a fault in the second subsystem and/or a fault in the third subsystem, and/or (ii) identify a faulty subsystem; and generating the surroundings model of surrounding of a module platform using the provided system.

* * * * *